United States Patent
Hsieh

(10) Patent No.: US 12,388,284 B2
(45) Date of Patent: Aug. 12, 2025

(54) SCREENING METHOD FOR RECHARGEABLE BATTERY CELLS

(71) Applicant: Taiwan Truewin Technology Co., Ltd., Hsinchu (TW)

(72) Inventor: Fang-Chi Hsieh, Hsinchu (TW)

(73) Assignee: Taiwan Truewin Technology Co., Ltd., Hsinchu (TW)

( * ) Notice: Subject to any disclaimer, the term of this patent is extended or adjusted under 35 U.S.C. 154(b) by 674 days.

(21) Appl. No.: 17/748,528

(22) Filed: May 19, 2022

(65) Prior Publication Data

US 2023/0378793 A1    Nov. 23, 2023

(51) Int. Cl.
*H02J 7/00*    (2006.01)
*H01M 10/44*    (2006.01)
*H01M 10/052*    (2010.01)

(52) U.S. Cl.
CPC ....... *H02J 7/00714* (2020.01); *H01M 10/446* (2013.01); *H02J 7/00041* (2020.01); *H01M 10/052* (2013.01)

(58) Field of Classification Search
USPC .......................................................... 320/112
See application file for complete search history.

(56) References Cited

U.S. PATENT DOCUMENTS

| 2003/0141845 A1* | 7/2003 | Krieger | H02J 7/007 320/132 |
| 2010/0194332 A1* | 8/2010 | Law | H02J 7/0013 320/110 |
| 2017/0229891 A1* | 8/2017 | Lee | H02J 7/04 |

OTHER PUBLICATIONS

JPH07322520 Machine Translation (Year: 1995).*

* cited by examiner

*Primary Examiner* — Samuel Berhanu
(74) *Attorney, Agent, or Firm* — HAUPTMAN HAM, LLP

(57) ABSTRACT

The present invention provides a screening method for rechargeable battery cells. A predetermined target capacity 2%~10% or a charging voltage lower than a nominal voltage of the rechargeable battery cells is adopted to charge the rechargeable battery cells, when approaching fully charged, observing the holding currents for each rechargeable battery cells and then screening the rechargeable battery cells based on the holding currents.

8 Claims, 4 Drawing Sheets

SCREENING METHOD FOR RECHARGEABLE BATTERY CELLS

BACKGROUND

Technical Field

The present invention relates to a screening method for rechargeable battery cells, especially related to a screening method based on holding currents.

Description of Related Art

FIG. 1 shows a prior art.

FIG. 1 shows a traditional method for screening lithium battery cells, the method comprises the steps as follows:
(1) Preparing a charger and rated 3.2V lithium battery cells;
(2) Electrically coupling the charger to the lithium battery cells;
(3) Charging the lithium battery cells with a voltage of 3.6V~3.65V, and then put aside for 7 days after them being fully charged;
(4) Measuring the voltage drops of the lithium battery cells;
(5) Is the voltage drop lower than or equal to a predetermined threshold? If yes, classified into group I; if no, classified into group II.

The traditional screening method is time-consuming and high cost for screening rechargeable battery cells.

The present invention firstly discloses a fast, convenient, cost effective and less time-consuming screening method for rechargeable battery cells.

DETAILED DESCRIPTION OF THE INVENTION

The experimental process according to the present invention is as follows:
(1) preparing a charger with constant current (CC) and constant voltage (CV) mode, and a plurality of rechargeable battery cells;
(2) electrically coupling the charger to the rechargeable battery cells;
(3) charging the rechargeable battery cells aiming at Target capacity 100%; checking holding currents for each rechargeable battery cell when the rechargeable battery cells approach full charged;
(4) discharging all the rechargeable battery cells;
(5) charging the rechargeable battery cells aiming at Target capacity 3%.

Target Capacity 100% to Charge:
For lithium battery cells: either target capacity 100% (at least 90%) is set to charge, or a corresponding charging voltage of 3.40V (or higher) is set to charge.

For lead-acid battery cells: either target capacity 100% (at least 90%) is set to charge, or a corresponding charging voltage of 13.50V (or higher) is set to charge.
when approaching fully charged, the holding current for each rechargeable battery cell is measured and recorded.

Target Capacity 3% to Charge:
For lithium battery cells: either target capacity 3% (2%~10% can be adopted) is set to charge, or a corresponding charging voltage of 3.10V (3.10V~3.18V can be adopted) is set to charge.

For lead-acid battery cells: either target capacity 3% (2%~10% can be adopted) is set to charge, or a corresponding charging voltage of 10.80V (or higher) is set to charge.
when approaching fully charged, the holding current for each rechargeable battery cell is measured and recorded.

The charging process is conducted according to the CC (constant current) and CV (constant voltage) procedure. The rechargeable battery cells are charged at a constant current until it approaches its final voltage. At this point, the charger switches aver to constant voltage mode and the charging current starts to decrease.

An appropriate constant charging current and charging speed can be set according to different capacity of the rechargeable battery cells;

When the rechargeable battery cells approach fully charged, the charging current drops to a stable minimum current value. Due to the characteristics of electrochemical batteries, each battery has a certain self discharge rate. Therefore, in order to maintain the rechargeable battery cells at a constant voltage, it is necessary to compensate for the self-discharge of the rechargeable battery cells with a holding current.

According to the magnitude of the holding current, the rechargeable battery cells can be screened into different quality groups according to the present invention; this method can also be applied to different types of rechargeable electrochemical cells.

Table 1 is the Data of the Experiments According to the Present Invention

According to the present invention, target capacity 100% to charge, then discharging, and target capacity 3% to charge are performed aver the same plurality of lithium battery cells.

Figure 1:
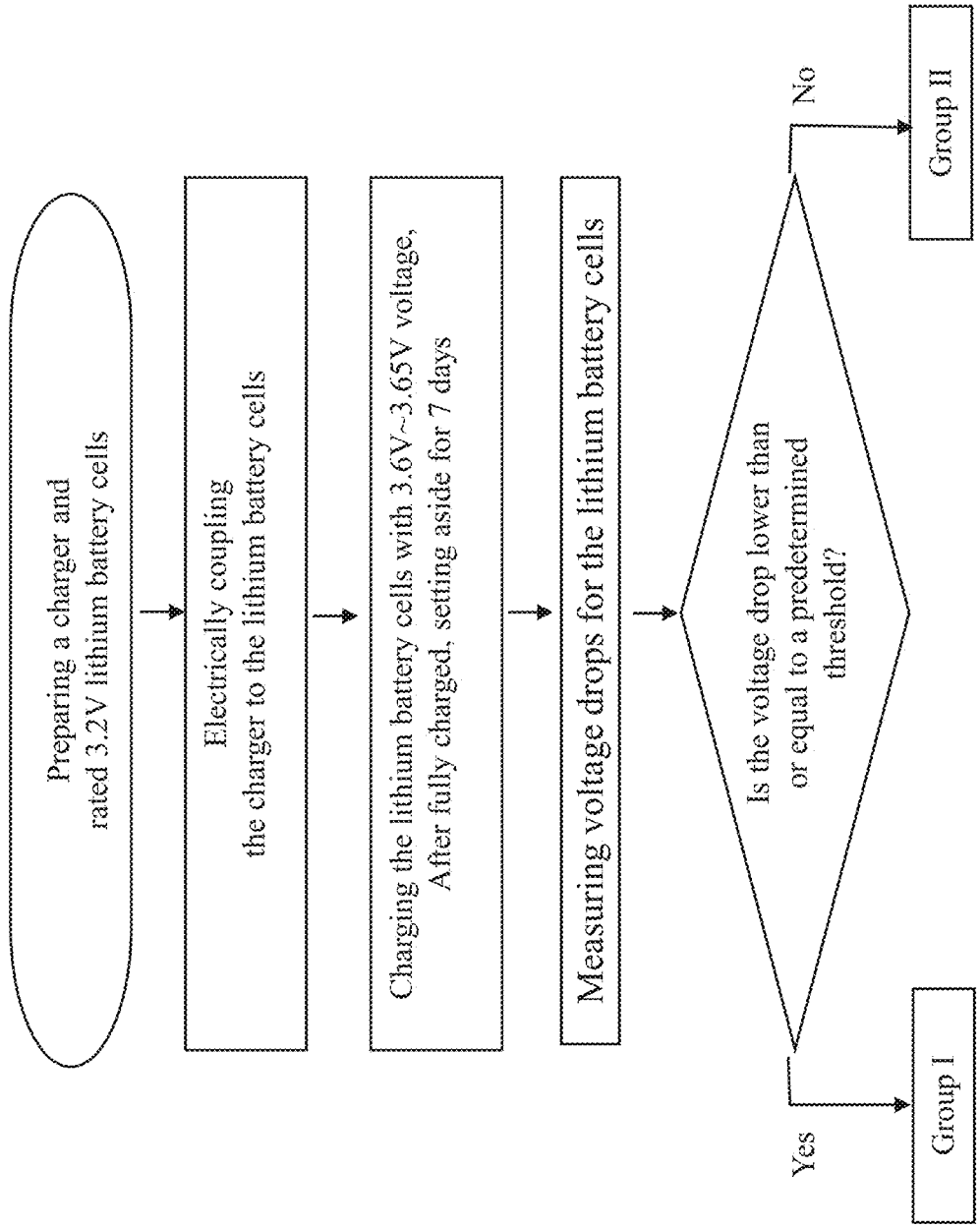
FIG. 1 shows a prior art.
Figure 2:
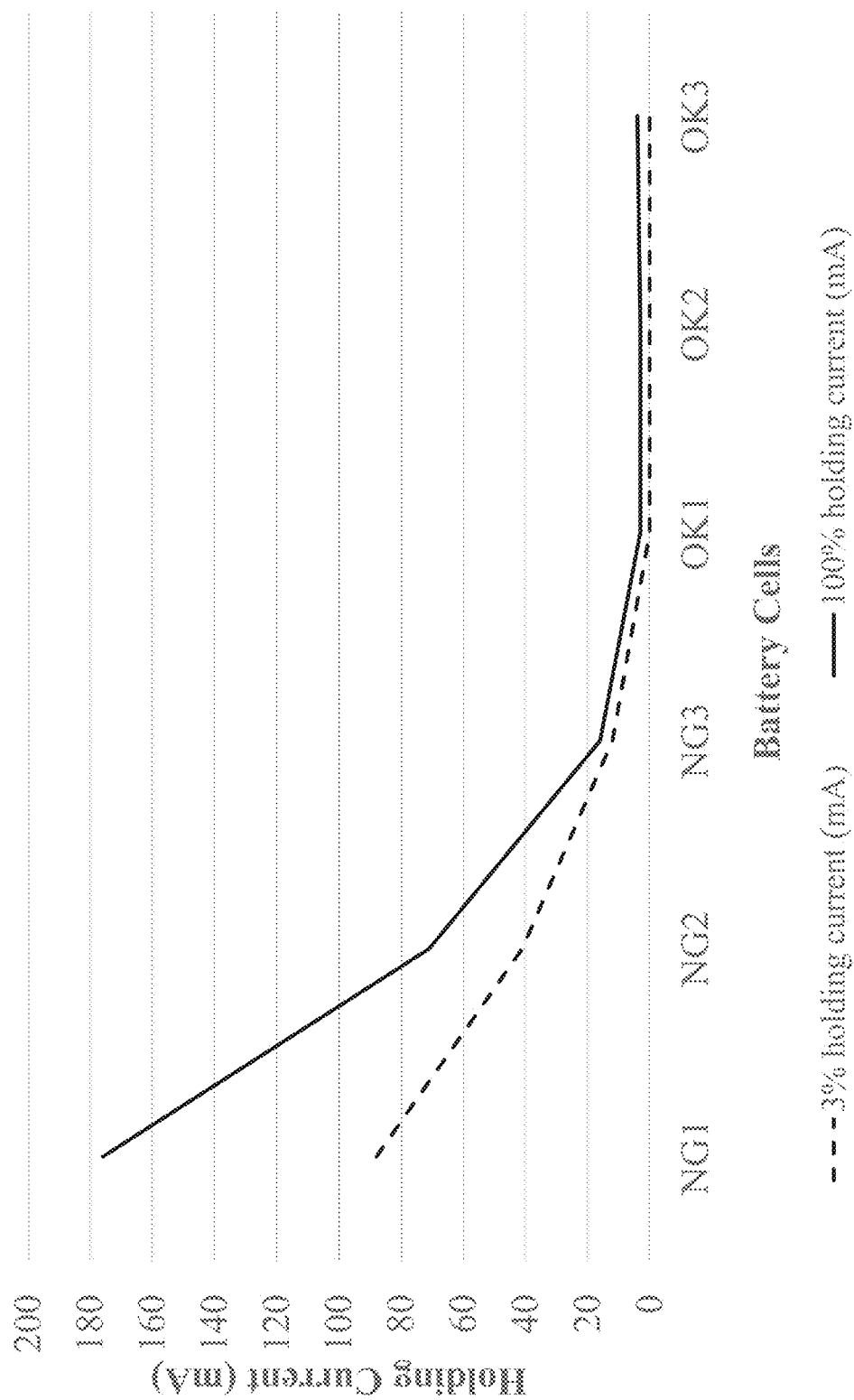
FIG. 2 shows holding currents distribution according to the present invention.

After the experiment, holding currents distribution are plotted as shown in FIG. 2. Three No-Good samples NG1, NG2, NG3, and three good samples OK1, OK2, OK3 are picked up for analysis, the data is shown in Table 1 below.

TABLE 1

| Samples | Target Capacity | Voltage observed | Holding current (mA) |
|---|---|---|---|
| NG1 | 100% | 3.40 V | 176 |
|  | 3% | 3.13 V | 88 |
| NG2 | 100% | 3.40 V | 71 |
|  | 3% | 3.13 V | 41 |
| NG3 | 100% | 3.40 V | 16 |
|  | 3% | 3.13 V | 12 |
| OK1 | 100% | 3.40 V | 3 |
|  | 3% | 3.13 V | <1 |
| OK2 | 100% | 3.40 V | 3 |
|  | 3% | 3.15 V | <1 |
| OK3 | 100% | 3.40 V | 4 |
|  | 3% | 3.15 V | <1 |

The data in Table 1 shows that the charging voltage is observed around 3.4V for the target capacity 100%, and the charging voltage is observed around 3.13-3.15V for the target capacity 3%.

Target capacity 100% charging experiment: the h ding currents of the No-Good rechargeable battery cells NG1, NG2, and NG3 are 176 mA, 71 mA, and 16 mA, respectively. The holding currents of the good battery cells OK1, OK2, and OK3 are 3 mA, 3 mA, and 4 mA, respectively.

Target capacity 3% charging experiment: the holding currents of the No-Good rechargeable battery cells NG1, NG2, and NG3 are 88 mA, 41 mA, and 12 mA, respectively. The holding currents of the good battery cells OK1, OK2, and OK3 are <1 mA, <1 mA, and <1 mA, respectively.

FIG. 2 Shows Holding Currents Distribution According to the Present Invention.

FIG. 2 is plotted based on the data shown in Table 1. By reviewing the data for target capacity 100%, a threshold among 1 mA~10 mA can be determined for dividing the No-Good samples and good samples into two groups.

Similarly, by reviewing the data for target capacity 3%, a threshold, a threshold among 1 mA~10 mA can be determined for dividing the No-Good samples and good samples into two groups.

According to the experimental results, it is found that the same threshold among 1 mA~10 mA can be used for either target capacity 100% or target capacity 3% for screening the rechargeable battery cells. Therefore, the present invention firstly proposes "target capacity 3% to charge" or "corresponding low voltage to charge" can be used, and their holding currents can be observed as a screening method for screening rechargeable battery cells.

Figure 3:
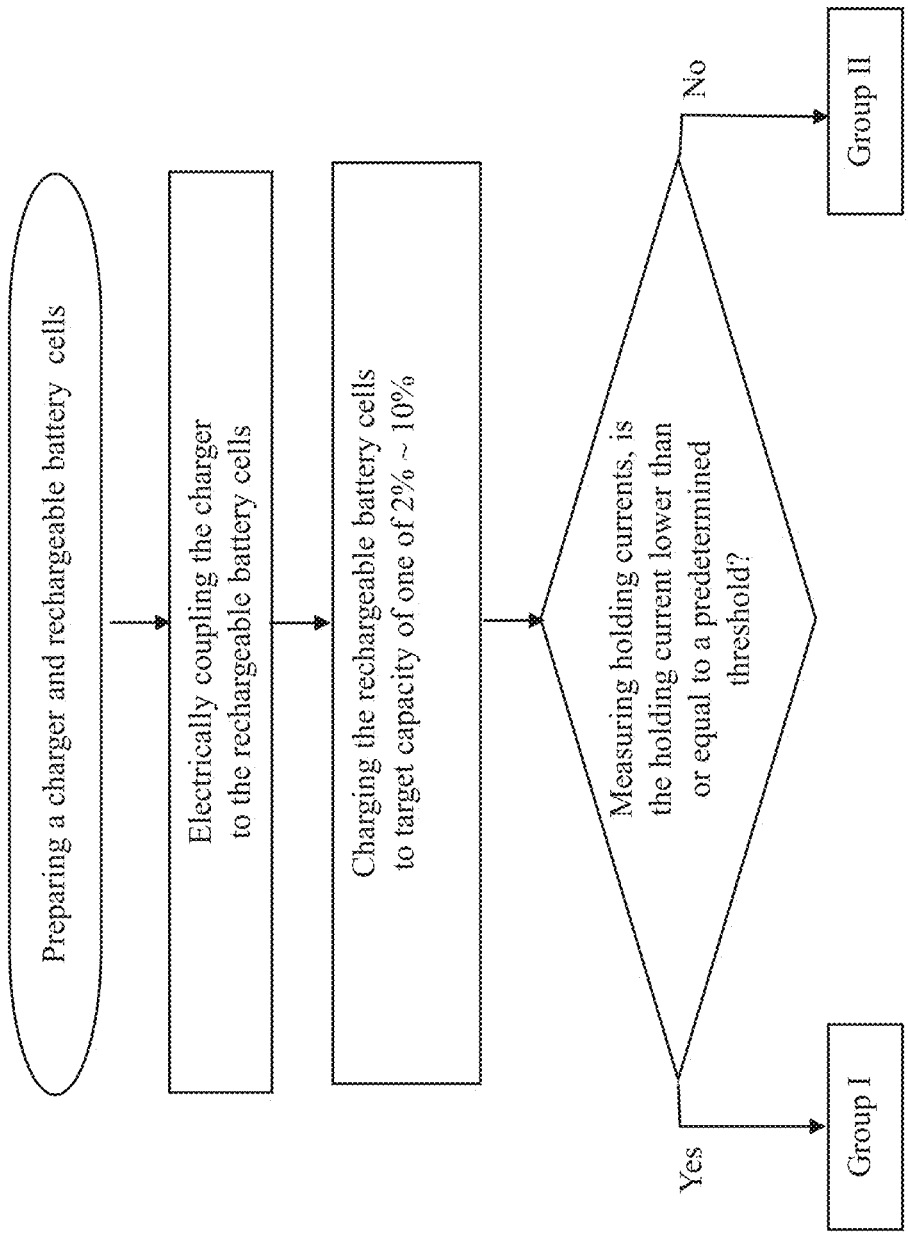
FIG. 3 shows a first screening method according to the present invention.

FIG. 3 Shows a First Screening Method According to the Present Invention.

FIG. 3 shows a first screening method for rechargeable battery cells, comprising:
(1) preparing a charger and rechargeable battery cells;
(2) electrically coupling the charger to the rechargeable battery cells;
(3) charging the rechargeable battery cells with a target capacity 2%~10%;
(4) measuring holding currents for each of the rechargeable battery cells when approaching fully charged, is the holding current lower than or equal to a predetermined threshold? If yes, classified into group I; if no, classified into group II.

According to the present invention, the rechargeable battery cells in step (1) can be rated 3.2V lithium battery cells; and the predetermined threshold in step (4) is one of 1 mA~10 mA.

According to the present invention, the rechargeable battery cells can be rated 12V lead acid battery cells.

Figure 4:
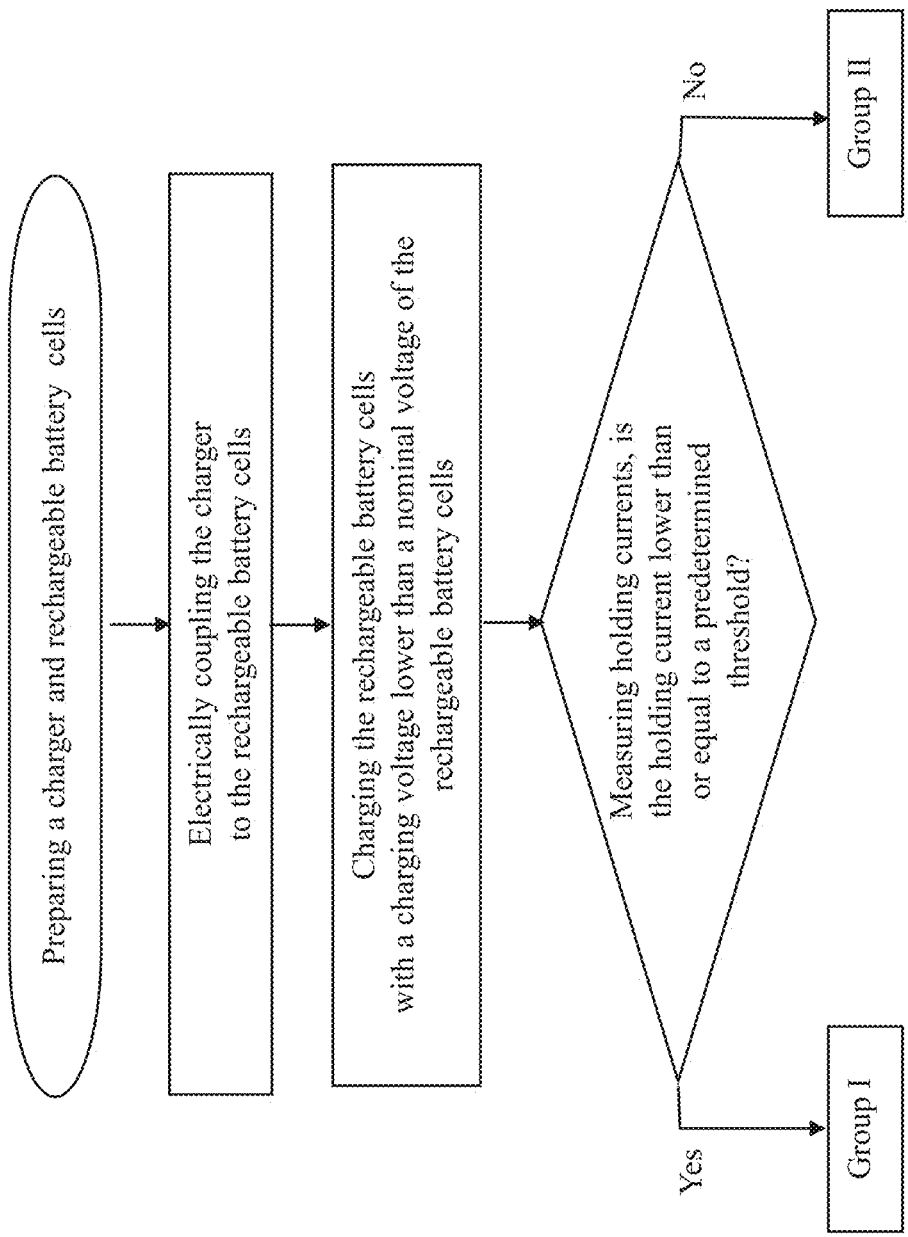
FIG. 4 shows a second screening method according to the present invention.

FIG. 4 Shows a Second Screening Method According to the Present Invention.

FIG. 4 shows a second screening method for rechargeable battery cells, comprising:
(1) preparing a charger and rechargeable battery cells;
(2) electrically coupling the charger to the rechargeable battery cells;
(3) charging the rechargeable battery cells with a charging voltage lower than a nominal voltage of the rechargeable battery cells;
(4) measuring holding currents for each of the rechargeable battery cells when approaching fully charged, is the holding current lower than or equal to a predetermined threshold? If yes, classified into group I; if no, classified into group II.

According to the present invention, the rechargeable battery cells in step (1) are rated 3.2V lithium battery cells, and the charging voltage in step (3) is set to be one of 3.10V~3.18V.

According to the present invention, the charging voltage in step (3) is set to be a voltage for charging the rechargeable battery cells to have a capacity of one of 2%~10%.

According to the present invention, the predetermined threshold in step (4) is one of 1 mA~10 mA.

According to the present invention, the rechargeable battery cells are rated 12V lead acid battery cells, and the charging voltage is step (3) is set to be one of 10.0V~11.5V.

According to the present invention, the charging voltage in step (3) is set to be a voltage for charging the rechargeable battery cells to have a capacity of one of 2%~10%.

While several embodiments have been described by way of example, it will be apparent to those skilled in the art that various modifications may be configured without departs from the spirit of the present invention. Such modifications are all within the scope of the present invention, as defined by the appended claims.

What is claimed is:

1. A screening method for rechargeable battery cells, comprising:
preparing a charger and rechargeable battery cells;
electrically coupling the charger to the rechargeable battery cells;
charging the rechargeable battery cells with a target capacity of one of 2%~10%;
measuring a holding current for each of the rechargeable battery cells when approaching a fully charged state, wherein the holding current is a current supplied to the rechargeable battery cell to compensate for a self-discharge of the rechargeable battery cell and to maintain the rechargeable battery cell at a constant voltage;
comparing the measured holding current of each rechargeable battery cell with a predetermined threshold;
in response to determining that the measured holding current of the rechargeable battery is lower than or equal to the predetermined threshold, classifying the rechargeable battery cell into group I; and
in response to determining that the measured holding current of the rechargeable battery cell is greater than the predetermined threshold, classifying the rechargeable battery cell into group II.

2. The screening method as claimed in claim 1, wherein the rechargeable battery cells are rated 3.2V lithium battery cells.

3. The screening method as claimed in claim 2, wherein the predetermined threshold is one of 1 mA~10 mA.

4. The screening method as claimed in claim 1, wherein the rechargeable battery cells are rated 12V lead acid battery cells.

5. A screening method for rechargeable battery cells, comprising:
preparing a charger and rechargeable battery cells;
electrically coupling the charger to the rechargeable battery cells;
charging the rechargeable battery cells with a charging voltage lower than a nominal voltage of the rechargeable battery cells;
measuring a holding current for each of the rechargeable battery cells when approaching a fully charged state, wherein the holding current is a current supplied to the rechargeable battery cell to compensate for a self-discharge of the rechargeable battery cell and to maintain the rechargeable battery cell at a constant voltage;

comparing the measured holding current of each rechargeable battery cell with a predetermined threshold;

in response to determining that the measured holding current of the rechargeable battery cell is lower than or equal to the predetermined threshold, classifying the rechargeable battery cell into group I; and in response to determining that the measured holding current of the rechargeable battery cell is greater than the predetermined threshold, classifying the rechargeable battery cell into group II.

6. The screening method as claimed in claim 5, wherein the rechargeable battery cells are rated 3.2V lithium battery cells, and the charging voltage is set to be one of 3.10V~3.18V.

7. The screening method as claimed in claim 5, wherein the predetermined threshold is one of 1 mA~10 mA.

8. The screening method as claimed in claim 5, wherein the rechargeable battery cells are rated 12V lead acid battery cells, and the charging voltage is set to be one of 10.0V~11.5V.

* * * * *